May 14, 1968
J. H. BLAKE ETAL
3,382,584
SUBLIMATION DRYING USING A CONDENSABLE HEAT CARRIER VAPOR
Filed Aug. 15, 1966
3 Sheets-Sheet 1
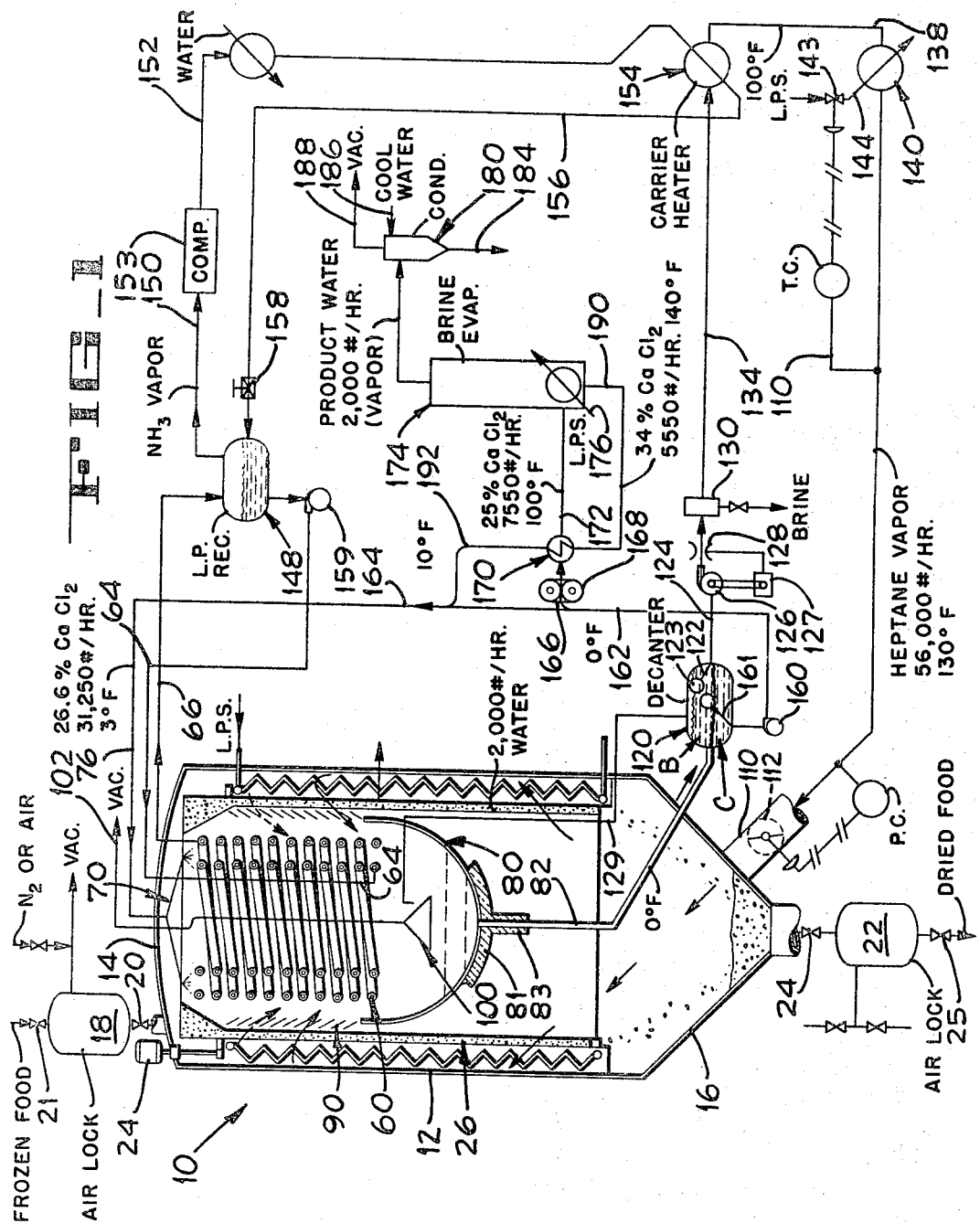
INVENTORS
JOHN H. BLAKE
JOHN P. PELMULDER
ERIK THUSE
BY Francis W. Anderson
ATTORNEY

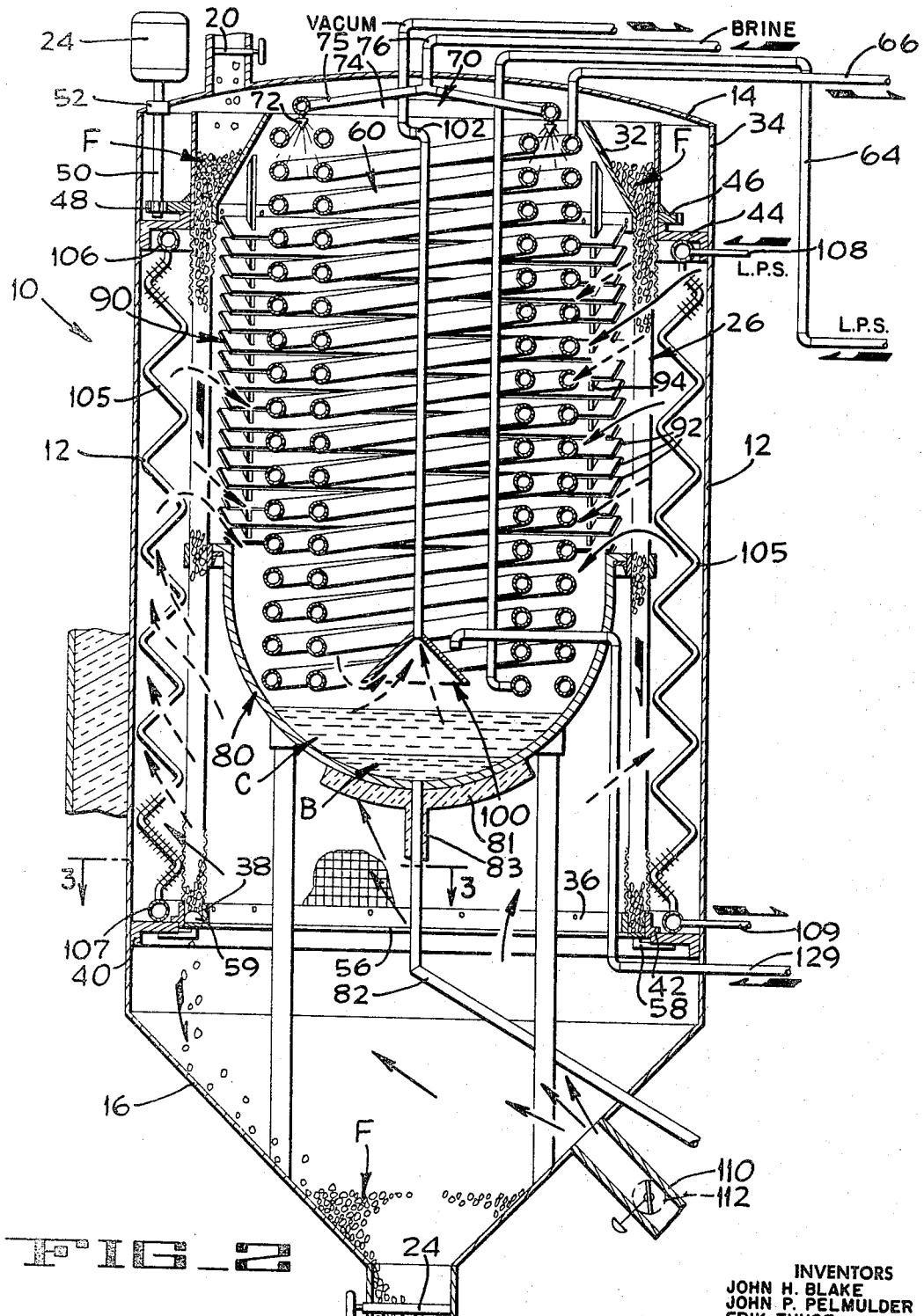

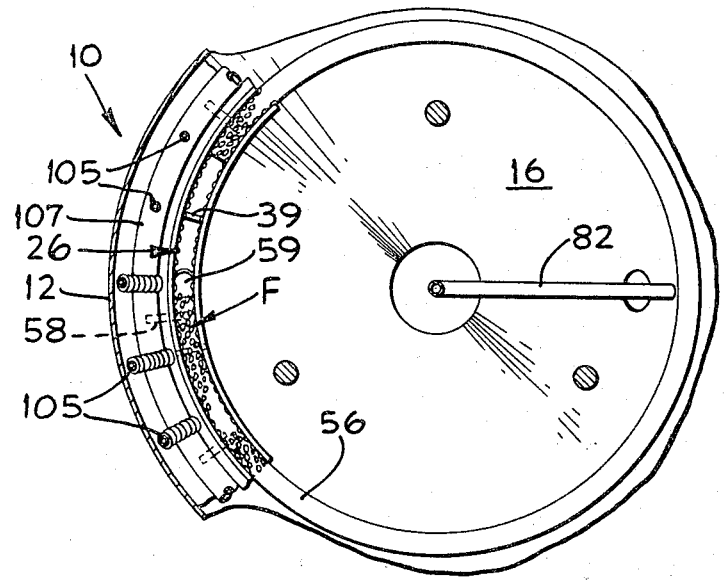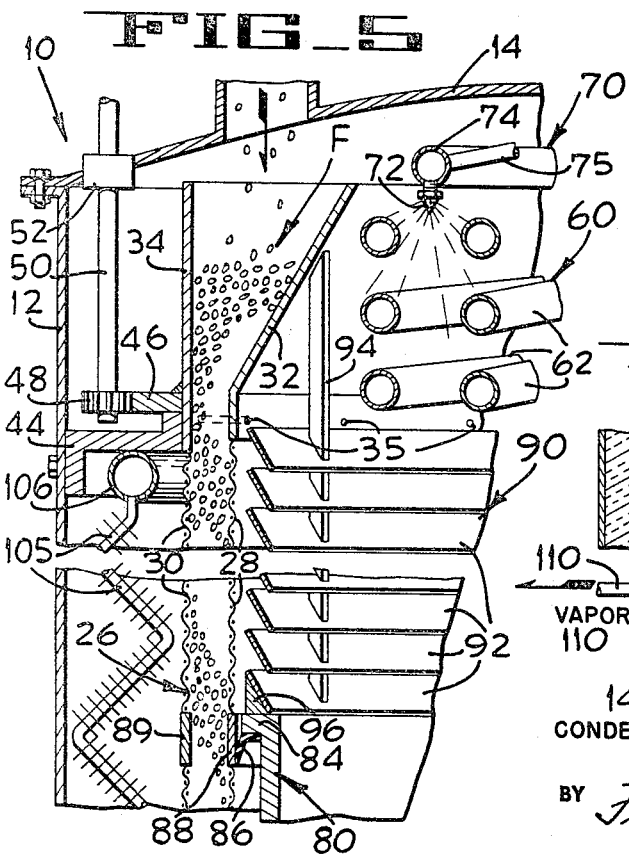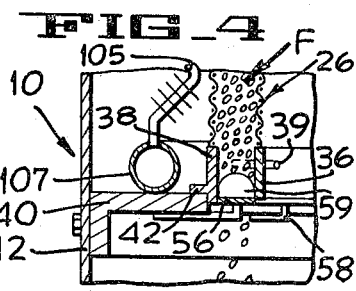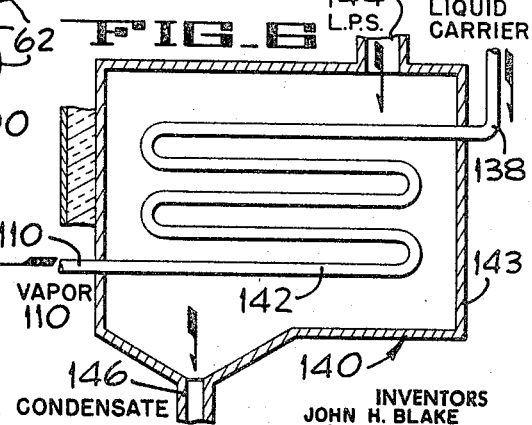

United States Patent Office 3,382,584
Patented May 14, 1968

3,382,584
SUBLIMATION DRYING USING A CONDENSABLE HEAT CARRIER VAPOR
John H. Blake, Portola Valley, John P. Pelmulder, Saratoga, and Erik Thuse, San Jose, Calif., assignors to FMC Corporation, San Jose, Calif., a corporation of Delaware
Filed Aug. 15, 1966, Ser. No. 572,401
26 Claims. (Cl. 34—5)

ABSTRACT OF THE DISCLOSURE

This invention relates to the drying of frozen porous products such as foods by sublimation, commonly referred to as freeze drying. Under this invention, a readily condensable, heat carrier vapor (such as heptane) makes at least two passes through a layer or bed of product moving through a vacuum drying chamber. The carrier vapor is immiscible with water. It is slightly superheated initially and picks up heat between the passes, and thus supplies the heat of sublimation to the product. The carrier gas and entrained water vapor are both condensed, the condensates separated, and the carrier fluid recirculated into the chamber.

Cross reference to related applications

This invention incorporates a radiant heat baffle vapor condenser of the type claimed in the copending application of Erik Thuse, Ser. No. 378,883, filed June 29, 1964, and assigned to the assignee of the present invention.

Background of the invention

The field of art to which the invention pertains is drying, including contact with solids.

A system for using an immiscible, readily condensable heat carrier vapor (gas) in a process of the type to which this invention relates appears in the patent to Barth et al. 3,218,728, assigned to the assignee of the present invention.

The present invention provides the following improvements and advantages over the aforesaid Barth et al. patent.

(1) The carrier liquid is flash evaporated, and throttled somewhat to a lower pressure before entering the drying chamber.

(a) This adds the heat of vaporization at a more efficient (higher) temperature than is done in a boiler.

(b) Mixtures of carrier liquid can be used without fractionation.

(2) The heat carrier vapor makes two (or more) passes through a moving food bed, passing through the leading portion (the portion leaving the drying chamber) first.

(a) This gives partially countercurrent flow, with the dry carrier contacting the almost dry product initially. Optimum drying plus optimum water entrainment by carrier leaving the wetter product portions en route to the condenser are ensued. The results are superior to those of systems such as Palmer 2,480,954 and Ravet 3,010,216.

(b) This facilitates a chamber design using a heat carrier gas for passing the product through the chamber continuously.

(c) The multi-pass carrier vapor path facilitates adding heat to the carrier between passes; thereby increasing the unit effectiveness of the carrier.

(d) The carrier is effective enough as a heat source so that at the most, only make-up heat may be added. The latter can be added in the drying chamber proper, but the unit need not be large. This leaves ample room in the drying chamber so that the condenser can also be mounted in the drying chamber.

(3) As mentioned, the condenser is located in the drying chamber. A vapor louvre type heat barrier shields entering carrier vapor from the condenser, without interfering with the relatively low driving force available to cause vapor flow to the condenser, contrary to Quiggle 1,756,992. Placement of the condenser in the drying chamber has advantages:

(a) No ducts are required.
(b) By spraying a condenser in the drying chamber with the cold brine, the ice that accumulates on the condenser is washed off the condenser and removed continuously with the brine and condensed carrier. This is another feature that facilitates continuous operation. No claim is made to the washing off of a cooling coil with a liquid broadly, this being known in Shields 2,613,513 (for example.)

(4) The product passes downward between the walls of a dual wall tubular screen, the screen rotates and the product enters one end, being plowed out of the other end.

(a) This facilitates a tortuous, multi-pass carrier path.
(b) The condenser fits nicely inside of the tubular screen at the chamber product inlet portion.
(c) The condenser is readily isolated from the incoming carrier by a simple heat barrier.
(d) There is ample room for makeup heater coils on the outside of the screen.
(e) Baffles for intercepting radiant heat from the product are readily provided between the product and the condenser.

(5) A number of other features and advantages incident to the invention will be best understood from the following detailed description of a preferred embodiment of the invention.

Description of the invention

FIGURE 1 is a schematic diagram of a freeze drying system for frozen food particles that embodies the invention.

FIGURE 2 is an enlarged sectional view of the drying chamber.

FIGURE 3 is a fragmentary section taken on line 3—3 of FIGURE 2.

FIGURE 4 is an enlarged fragmentary section showing the mounting of the lower end of the screen.

FIGURE 5 is an enlarged fragmentary section showing the mounting of the top or feed end of the screen.

FIGURE 6 is a diagram showing the essentials of a flash boiler for the carrier fluid.

*Drying chamber.*—Before describing a freeze drying system embodying the present invention, the essential elements of a preferred type of drying chamber will be described in connection with FIGURES 2 to 5. The drying chamber, illustrated generally at 10, is an airtight vessel, suitable for operating in a vacuum, the design details not being critical to the present invention. The drying chamber includes a cylindrical sidewall 12, a top wall 14 which may be removable, insulation 15 (FIGURE 2) around all the walls and a bottom wall 16 which also serves as a removal hopper for the dried product. The product being dried is illustrated generally at F and could be introduced in the form of frozen discrete particles of food or the like, the details of the product not being critical to the invention.

The drying chamber of the present invention is designed to operate continuously, so that the frozen product is introduced through an inlet airlock 18. As in conventional design, the airlock includes a valve at the inlet and outlet sides of the airlock, such as a slide valve 20 shown in FIGURE 2 at the inlet to the drying chamber. A similar valve 21 will be provided at the inlet to the airlock for admitting the frozen food to the latter. These airlocks are known in the art and are provided with a line for selective connection to a vacuum pump during drying, or to a source of an inert gas such as nitrogen ($N_2$), during loading, with suitable valves. Air can also be admitted through the airlock for breaking the vacuum. A dry product airlock 22 is connected to the hopper 16 and is likewise provided with a slide valve 24 and a similar valve 25 with lines for connection to a vacuum line or to an inert gas line by valving.

As mentioned, the drying chamber 10 is designed to have passed therethrough a continuous flowing stream, layer or bed of frozen material, which material is dried in the chamber and withdrawn through the airlock 22. The drying chamber of the present invention conveys the material in the form of an annular layer or bed so disposed that the heat carrier gas can pass completely through the layer and over a tortuous path, thereby making at least two passes through the product. In order to accomplish this, the product or food F flows down through a spaced sidewall tubular screen or basket assembly, indicated generally at 26. The screen is rotated during operation and the slight jiggling effect thus provided, coupled with the force of gravity, is sufficient to prevent bridging of the material as it flows down through the screen.

The screen has inner and outer wire screen wall members 28, 30 which are of a mesh fine enough to confine the food particles both in the frozen and dried state, but coarse enough to freely pass water vapor and carrier gas. In order to admit frozen food F to the screen, divergent hopper bands 32, 34 are secured to the inner and outer screen members 28, 30, respectively. The screen members are spaced by spacer rods 35 that extend radially between these bands. At the lower end of the screen, stiffener bands 36, 38 are secured to the inner and outer screens 28, 30, respectively, and are separated by spacer rods 39 extending radially between the bands.

As mentioned, the screen is rotatably mounted in the drying chamber. The details of this mounting are not critical and a simplified construction appears in FIGURE 4 for supporting the lower end of the screen. A combined bearing plate and vapor seal member 40 is secured to the sidewall 12 of the drying chamber and supports a flange 42 projecting outwardly from the outer band 38 just described. This supports and guides the screen for rotation. The plate 40 can be provided with sawtooth surfaces for jiggling the screen (if necessary) to augment the effect of gravity in causing flow of the food F down between the screens 28 and 30.

The mounting and guide for the upper portion of the screen 26 appears in FIGURE 5 in simplified form. A plate 44 secured to the wall 12 of the drying chamber serves as a combined vapor seal and support for the upper portion of the screen. A ring gear 46 is welded to the upper band 34 of the screen and is meshed with a pinion 48 driven by a shaft 50 projecting down through a rod joint and seal assembly 52 of conventional design, mounted in the cover of the drying chamber. The shaft 50 is turned to rotate the screen 26 by an electric gearmotor 24 at a suitable gear reduction, which preferably includes a variable speed drive not shown in detail.

Although dimensions are not critical to the present invention and by way of example, in a large installation the screen or basket 26 will be about twenty feet high, thirteen and one-half feet in outside diameter and the spacing between the screen walls 28 and 30 will be six inches. The screen will be rotated about one r.p.m., and sufficient product will be passed through the unit to require sublimation of 2,000 pounds of water vapor per hour. The dried product will usually contain three percent or less moisture.

Means are provided to cause the dried product (e.g., food) to be removed from the basket 26 while controlling the flow of the food downwardly therethrough to insure a residence time such that the product is properly dried in the chamber. This is accomplished by the mounting of an arcuate product support ring 56 between the lower ends of the screen walls 28 and 30, which ring may be supported by means of radial rods 58 that are fastened or welded to the under surface of the basket supporting ring 40 (FIGURE 4). A plow tab 59 is bent up from one end of the support ring 56 to plow out the dried product as it is brought against the tab 59 due to rotation of the basket 26 (FIGURE 3). The dried food falls through the gap between the tab and the other end of the ring 56, down into the hopper 16 (FIGURE 2), from which it can be removed by operation of the airlock 22, including the slide valve 24, in accordance with conventional practice.

It is a feature of the present invention that, although the drying chamber need not be overly large (considering the amount of product under treatment), the condenser 60 for condensing the sublimed water vapor emanating from the product and the carrier gas can be mounted directly in the drying chamber. As will also be seen, problems which might otherwise interfere with this mounting of the condenser in a compact chamber are not present in the chamber of the present invention. Because the food basket or screen 26 is a dual wall tube, the condenser can be mounted inside of the screen. In fact, the condenser only occupies an upper or inlet portion of the screen for reasons to be explained. The condenser 60 comprises a double coil refrigerant evaporator 62, having a liquid refrigerant inlet line 64 from the receiver and expansion valve of the refrigeration system and a vaporized refrigerant outlet line 66 leading to the compressor of the refrigeration system.

As mentioned, in order to insure effective operation of the condenser, that is, to insure that the partial pressure of the water vapor in the drying chamber is below that of the triple point of water; or in the case of foods containing appreciable water soluble substances, that the partial pressure of water vapor be less than the vapor pressure of water at the temperature necessary to maintain the foodstuff in a sufficiently frozen state (i.e., $-10$ degrees F. with strawberries); the ice that accumulates on the condenser is washed off with a brine spray. This makes continuous operation possible. Without the brine spray, after a certain amount of ice had accumulated on the condenser the process would have to be stopped for removal of the ice. The brine spray system, indicated generally at 70 (FIGURE 2) comprises a circular array of nozzles 72 depending from an annular brine header 74. The header is suspended by radial brine feeding lines 75 and a central brine inlet line 76, the details of which are not critical to the invention. The manner in which the brine is supplied to the system will be explained presently, in connection with the description of the complete system diagram of FIGURE 1.

In order to collect the diluted brine and condensed carrier liquid and to serve as a vapor barrier for the carrier vapor, a combined condensate and brine catcher basin 80 extends across the interior of the basket 26 at an intermediate portion of the basket. The basin 80 is supported by means not critical to the invention, such as a plurality of legs 83 upstanding from the hopper 16 of the drying chamber. The lower side of the basin 80 is insulated at 81 so that carrier vapor will not condense on its underside and drip onto the dried food. A condensate and brine removal pipe 82, insulated as at 83, depends from the basin 80 for connection to a separator or decanter for recovering the carrier liquid from the brine as will be described in connection with the diagram of FIGURE 1.

As seen in FIGURE 5, in order that the basin 80 serve as a vapor barrier, it has a rim 84 that mounts a flexible sealing lip 86 which makes frictional, rotatable engagement with a band 88 secured to the inner screen wall 28 of the basket. A stiffener band 89 is secured to the outer screen wall 30 and these bands are connected by spacer rods to stiffen the intermediate portion of the basket.

A radiant heat baffle 90 is provided between the basket 26 and the condenser 60 in order to intercept radiant heat from the food within the basket, without interfering with vapor flow to the condenser. The baffle is formed of louvres 92 which effectively intercept radiant heat but present substantially no resistance to vapor flow and hence do not interfere with the relatively low driving force that causes vapor to flow to the condenser 60.

As seen in FIGURE 5, the louvers are shown mounted in a fixed relation on standards 94 and are secured to a mounting ring 96 that surrounds the lower louver for mounting on the lip 84 of the barrier basket 80. If desired, the louvers can be made adjustable, as described in the aforesaid Thuse application.

Means are provided for removing the non-condensable gases from the drying chamber in the vicinity of the condenser. For this purpose, a vacuum baffle 100 in the form of an inverted cone is mounted within and below the condenser coils 60 and a vacuum line 102 leads from the baffle for connection to a vacuum pump, not shown in the drawings. The operation of a vacuum pump of this type is known in the freeze drying art.

One of the features of the present invention is that the carrier gas can make at least two passes in a direction generally counter-current to the direction of food passage through the drying chamber. Advantage is taken of this for the addition of make-up heat to the carrier gas in order to cause the carrier gas to be more effective as an agent for subliming the water vapor from the product. In the drying chamber of the present invention, the make-up heat is provided by an annular row of generally vertical sinuous tubes 105 which are finned to increase their area of contact with the gas. These tubes connect between upper and lower headers 106, 107 which, in turn, connect to inlet and outlet lines 108, 109 for receiving low pressure steam (LPS) as a heating agent, and discharging it as a condensate in accordance with conventional heating practice.

The vaporized carrier which, for example, could be heptane vapor, is admitted to the drying chamber by an inlet duct 110 connected to the hopper 16. The flow through the duct is throttled by an automatic damper valve 112 in order to establish a predetermined pressure upstream of the valve and hence assist in controlling the saturation of the vapor in the process. The level of the food F in the hopper will ordinarily not be permitted to block the inlet 110. The carrier gas will be slightly super-heated at the pressure upstream of valve 112 and at a temperature above 130 degrees F., in the example given. Because of the drying chamber construction just described in detail, the carrier gas will first flow up through the exit portion of the annular tube of food in the basket 26, that is, the carrier vapor will first flow through the leading portion of the moving annular product body. The incoming carrier gas will be partially confined by the vapor barrier 80 so that it must flow through the food bed as indicated by the solid arrows. In this pass the carrier gas conducts heat to the ice cores within the particles of frozen food by diffusing through the water vapor subliming from the food, thereby accelerating the subliming process. Also, the carrier vapor, as it passes through the food bed, helps sweep away water vapor sublimed from the ice cores, thereby holding the partial pressure of the water vapor to a value well below the triple point pressure.

Thus, even though the carrier gas is at about 130 degrees F., water vapor is swept away as it forms, so that as mentioned, the partial pressure of the water vapor will not rise above approximately four millimeters of mercury or less, which correspond to the entectic point. The partial pressure of the carrier vapor will be in the order of 5 to 15 millimeters mercury in this example.

The initial pressure of the carrier cannot be too high because it must not condense in the first pass through the food bed, which may be at a temperature as low as 10 degrees to as high as 130 degrees F. in this zone. It will not condense during the second pass where the product is colder, because the carrier vapor flows across the heating coils 105 between passes, thereby having its non-condensing, equilibrium state re-established in case it had approached the condensing state in the first pass and because its partial pressure is lower due to the water vapor it entrains, and because of the drop in total pressure provided to make the vapor flow.

The carrier gas, which is urged in the general direction of the condenser by a gradient in the total pressure is confined so that it must next pass through the trailing (chamber entering) portion of the material by the sidewall 12 of the drying chamber and the basket mounting rings 40, 44. The re-heated carrier gas now diffuses through the entering, wetter bed of food and further assists in the subliming operation. During both passes, the carrier gas flow, indicated by solid arrows assists in picking up or entraining the sublimed water vapor, indicated by the dashed arrows, and hence assists in bringing the water vapor to the coils 62 of the condenser 60. Of course, the pressure differential established by the fact that the pressure is a minimum at the condenser 60 supplies a "driving force" urging both the carrier gas and the water vapor to flow toward the condenser. The vapor flow just described is not substantially inhibited by the louvers 90, whereas these louvers do intercept radiant heat re-radiated from the food F, and emanating from the heater coils 105.

The water vapor is condensed and frozen on the condenser coils 62 whereas the carrier vapor is liquefied by those coils. The brine from the spray nozzles 72 melts and washes off the ice on the condenser coils so that a layer of brine B, upon which rests a layer of liquefied carried C, is caught by the combined basin and gas barrier 80. This composite liquid mixture is withdrawn from the drying chamber through an insulated liquid line 82 and into the decanter for separation as fast as it falls into basin 80, as will be described. During this process, the basket 26 is rotating and the food is being fed through the airlock 18 as required. The food is being plowed out at the lower end of the basket 26 by the ring 56 and plow 59, and the dried product falls into the hopper 16 for removal through the airlock 22.

*Drying system.*—A preferred system, using the drying chamber of the present invention is illustrated schematically in FIGURE 1 and the flash boiler for the carrier liquid is shown diagrammatically in FIGURE 6. In the description of the system that follows, reliance will be placed upon the previous detailed description of the drying chamber itself for an understanding of the actions as they occur in the chamber.

*Carrier fluid circuit.*—Starting with the liquid carrier C falling into basin 80 in the drying chamber, a mixture of the carrier and the diluted brine B drains freely through pipe 82 into a decanter 120. The carrier C and the immiscible brine B separate by gravity, and the carrier if it is heptane, for example, will form a layer on top of the brine. The carrier is withdrawn through a jointed or flexible pipe 122 supported by a float 123 and connected to a pipe 124. The carrier is withdrawn by means of a constant flow rate pump 126. This pump may be made to deliver the carrier at a constant rate by any suitable control, for example, by variable speed drive 127 controlled by an orifice flow sensor unit 128 of conventional design. In order to prevent the decanter 120 from becoming airbound an air bleed line 129 leads from the decanter into the drying chamber adjacent the inlet for the vacuum line, so that non-condensable gases in the decanter will be withdrawn through the vacuum evacuation system of the drying chamber.

The carrier liquid C passes from the pump 126 to a filter 130, the purpose of which is to separate any brine that remains entrained with the carrier. This filter may be a fuel-type filter having a hydrophobic element therein that permits only organic liquid to flow readily through the filter element. Details of the filter are not critical to the invention and a filter cartridge of the type sold as Cartridge MC 1001 EE by the Pall Trinity Micro Corp., Cortland, N.Y., is suitable.

The purified carrier liquid then passes through a line 134 to a heat exchanger 154, which operates as a heater for the carrier (assumed to be heptane in this example) and a cooler for the refrigerant, assumed to be ammonia in this example. The preheated carrier liquid then passes through line 138 to a flash heptane vaporizer 140. Here, the liquid heptane is both flash vaporized and superheated slightly by a low pressure steam source LPS. As seen in FIGURE 6, the liquid carrier entering the vaporizer in line 138 passes through coils 142 within a steam chest 143 of the vaporizer. The heat transfer surface of the coil 142 with the given steam heat source is more than sufficient to evaporate all of the carrier liquid at the temperature and flow rate desired. The coefficient of heat transfer in the vaporizer is relatively high when the carrier is in its liquid phase and hence the carrier is readily vaporized. The heat transfer coefficient to the vapor is quite low, and hence although a certain amount of superheat is applied, the process is, self-limiting and the carrier vapor pressure does not rise in an uncontrolled manner. Thus, the carrier vapor is superheated, but not excessively, when it leaves the flash vaporizer 140 and the carrier vapor re-enters the drying chamber by means of the line 110, previously described.

Automatic controls are provided for the carrier vaporization step. The temperature of the vapor is controlled by a conventional temperature controller TC, which senses the temperature in the line 110 and operates an automatic valve 143 in the line 144 for low pressure steam LPS entering the flash vaporizer 140. As seen in FIGURE 6, the steam passes into the steam chest of the vaporizer and the condensate leaves the vaporizer by the line 146, in accordance with conventional practice. The temperature controller TC prevents excessive superheating by controlling the heat source for the flash vaporizer. The pressure of the carrier vapor is controlled by the valve 112 previously described, and a conventional automatic controller indicated schematically in the diagram has a pressure controller PC of conventional design. The pressure of the carrier is established to be slightly less than the saturation pressure at the selected carrier vapor temperature which temperature in the example given is maintained at approximately 130 degrees F. A suitable controller PC is manufactured by the Bristol Company of Waterbury, Conn., under the name Pneumatic Controller 1A 552 B and Absolute Pressure Transmitter B 3C 65 OMA-14A.

In the example being described, assuming that 2,000 pounds of water per hour will be evaporated from the product F and assuming that the carrier is n-heptane 56,000 pounds of carrier per hour will be circulated through the carrier circuit of the system. Evaporated refrigerant which, in this example is ammonia, leaves the drying chamber condenser coils 62 (which serve as the evaporator in the refrigeration system) through a line 66 and enters the low pressure receiver 148 of the refrigeration system. The gaseous refrigerant is drawn into the compresser through a line 150, and the hot refrigerant is supplied by the compresser through a line 152 and preferably through a water cooled condenser 153 to a heat exchanger 154, which serves as a heptane (carrier) heater and an ammonia condenser. The condensers 153 and 154 may be conventional type heat exchangers, the details of which are not critical to the invention and hence the devices are shown only diagrammatically.

The liquefied refrigerant leaves the heat exchanger 154 through a line 156 and is conducted to an expansion valve 158 back to the low pressure receiver 148. The liquid refrigerant is pumped from the receiver by a pump 159 which returns it to the line 64 forming the inlet line for the drying chamber condenser coil 62, previously described. The liquid refrigerant entering the condenser coil 62 in the drying chamber will be at a temperature of approximately 25 degrees F. and the refrigeration system has sufficient tonnage to condense the carrier and water vapor that reaches the condenser 60 in the drying chamber.

*Brine circuit.*—As previously mentioned, the brine sprayed onto the condenser 60 is diluted with water vapor sublimed from the product and this solution drains from the gas barrier basin 80 by means of pipe 82 and flows into the decanter 120. Here the brine B separates from the carrier C by gravity, and the brine pump 160 takes suction below a bulb 161 which floats at the brine carrier interface and the pump circulates the brine via a delivery line 162 which has a main branch 164 for returning the brine to the inlet pipe 76 for the brine spray nozzles. Part of the brine from the decanter 120 is diverted into a line 166 by means of a constant delivery pump 168 and flows into a heat exchanger 170 of conventional design. The diluted brine drawn off in branch line 166 leaves the heat exchanger 170 via a line 172 and enters a brine evaporator 174. Here the brine is heated by a low pressure steam LPS from a line 176 in a conventional manner at a temperature sufficient to evaporate 2,000 pounds per hour of product water. This is the amount of water vapor that has been sublimed from the product in the drying chamber, frozen on the condenser 60, and washed into the brine from the condenser. The brine evaporator is operated under a vacuum using a barometric condenser 180, the product water leaves the evaporator 174 via a line 182 leading to the barometric condenser 180. Condensed water vapor flows out of a leg 184 of the barometric condenser. Cooling water enters the barometric condenser 180 through an inlet line 186, and a vacuum connection from the vacuum pump is made to the condenser by a line 188.

Returning to the brine evaporator 174, concentrated brine leaves the evaporator by a line 190 which passes through the heat exchanger 170 and hence is cooled by the cold incoming brine in line 168. This cooled, concentrated brine, which will be at approximately 10 degrees F., leaves the heat exchanger 170 through a line 192 which connects with the main line 164 for return to the spray nozzles 172. In the example being given the brine entering the spray nozzle 172 will be a 26.6 percent calcium chloride solution and will be flowing at the rate of 31,250 pounds per hour at a temperature of about 3 degrees F. The brine diverated in the concentrating line 166 will be diluted to a 25 percent calcium chloride solution, and will be delivered to the brine evaporatory at a rate of 174 pounds per hour and at about 100 degrees F. The concentrated brine leaving the brine evaporator 174 in line 190 will have a composition of about 34 percent calcium chloride and will leave at a flow rate of 5550 pounds per hour at about 140 degrees F. As mentioned, after passing through the heat exchanger 170, this concentrated brine rejoins the main stream in pipe 164 at a temperature of 10 degrees F., so that since main steam initially in pipe 164 is at a temperature of about zero degrees F. the temperature of the brine entering the spray nozzle 72 in the drying chamber is about 3 degrees F.

Having provided a detailed description of a preferred embodiment of the invention, it can be seen that the drying chamber and associated components are particularly adaptable to continuous operation. The various features and advantages of the drying chamber mentioned in the opening remarks will now be apparent. The advantages of the condensable heat carrier gas in a freeze drying system are outlined in detail in the aforesaid Barth et al. Patent 3,218,728. Various criteria that assist in the selection of a carrier fluid are set forth in that patent. However, carrier selection is not as critical in this invention as in the Barth et al. patent, because of the use of a flash vaporizer for the carrier, namely the heptane given in the present example. Because the flash vaporizer produces total vaporization of the carrier under a slight superheat, a mixture of carrier fluids can be used, such as isomeric heptanes, close boiling mixtures of fluorocarbons, and similar fluids. All that is required is that the higher boiling point components never be permitted to become fully saturated in the inlet line to the drying chamber.

It will be noted that no solids have to be conveyed, separated or piped in the vapor condensing system, even though this system is within the drying chamber. This is due to the circulation of brine for washing off and melting the ice accumulating on the condenser coils in the drying chamber. By circulating sufficient brine to completely melt the ice that is initially formed on the coils from sublimed water vapor, handling problems in the continuous process are reduced to a minimum.

Having completed a detailed description of the invention so that those new in the art may practice the same, we claim:

1. The method of sublimation drying frozen porous material comprising the steps of passing a stream of readily condensable heat carrier gas successively through adjacent portions of a material layer in a sub-atmospheric pressure drying chamber to sublime vapor from the frozen material, supplying heat to the gas while it is passing through the chamber and between successive passes through the material in order to insure that the carrier gas will not condense, condensing the gas and sublimed vapor in the chamber, and removing the condensed gas and vapor from the chamber.

2. The method of claim 1, wherein said material layer is moved along the drying chamber during drying, and said carrier gas stream is first passed through the leading portion of said material layer.

3. The method of claim 2, wherein said material layer is moved through the drying chamber in the form of a cylindrical shell, and said gas and sublimed vapor are condensed in a zone that is inside a trailing portion of the cylindrical shell of moving material.

4. The method of claim 3, wherein radiant heat energy coming from the shell of material is intercepted inside the shell before it can enter the condensing zone.

5. The method of sublimation drying frozen porous material comprising the steps of conducting a layer of the frozen material through a drying chamber maintained at sub-atmospheric pressure; vaporizing a readily condensable liquid, that is substantially immiscible with water and that condenses from its vapor state as readily as possible subject to the limitation that it have a vapor pressure that is higher than the triple point pressure of water at 32 degrees F.; passing a stream of the vapor as a heat carrier vapor through a leading portion of said moving frozen material layer that has been partially dried; continuing the stream of carrier vapor and entrained water vapor through a trailing portion of said frozen material layer; condensing both the stream of carrier vapor and the entrained water vapor in a condensing zone that is within the drying chamber and adjacent the trailing portion of the frozen material layer but that is isolated from the entering stream of carrier vapor except via flow through the material; maintaining the condensation rate sufficient to maintain the partial pressure of water vapor in the chamber low enough to insure sublimation; and removing the water and carrier liquid condensate from the chamber.

6. The method of claim 5, including the step of adding heat to said stream of carrier vapor as the stream flows from the leading to the trailing portion of the material being dried.

7. The method of claim 6, including the step of intercepting radiant heat leaving the trailing portion of the material before the heat reaches said condenser.

8. The method of claim 6, including the steps of spraying the condenser with cold brine and removing the brine along with said condensate.

9. The method of claim 5, wherein said readily condensable liquid is heptane.

10. The method of claim 5, wherein said carrier liquid is separated from the water-condensate diluted brine, vaporized and reintroduced into the drying chamber; and wherein the separated, diluted brine is concentrated and recirculated over the condenser.

11. Apparatus for the sublimation drying of a frozen porous material using a readily condensable heat carrier gas; said apparatus comprising a drying chamber having means for introducing and removing the material, means for forming a layer of the material in said chamber, means for providing a tortuous gas path through the material, means for introducing a condensable heat carrier gas to said chamber at one end of said path, means for condensing the carrier gas and sublimed vapor at the other end of said path, means for adding heat to the carrier gas intermediate said tortuous path, and means for removing the condensed carrier gas and vapor from said chamber.

12. The apparatus of claim 11, wherein said material layer forming means causes motion of the layer through the chamber as a hollow tube of material, means are provided for adding heat to the carrier gas outside of said tube of material, and said condensing means is inside of said tube of material.

13. The apparatus of claim 12, wherein a radiant heat baffle is disposed between said tube of material and said condensing means.

14. The apparatus of claim 12, wherein said condensing means is disposed in the inlet portion of said chamber, and wherein a gas barrier extends across the inside of an intermediate portion of said material layer forming means for isolating said condensing means from an incoming stream of gas flowing inside of the exit portion of the tube of material.

15. The apparatus of claim 14, wherein said gas barrier is insulated.

16. The apparatus of claim 14, wherein said heat adding means surrounds substantially the entire length of the tube of material.

17. The apparatus of claim 15, wherein a radiant heat baffle is disposed between the tube of material and said condensing means.

18. Apparatus for sublimation drying of solids comprising a drying chamber, a vacuum producing means connected to said drying chamber, a spaced wall, open ended tubular screen rotatable within said chamber, means mounting said screen for rotation about an axis included from the horizontal sufficiently to cause solids to slide axially along said screen, means for rotating said screen, means for moving material to be dried into and out of the ends of said screen between its walls, a vapor barrier extending across an intermediate portion of said screen, a vapor condenser within said screen and on the material entry side of said barrier, means for admitting a readily condensable heat carrier vapor to said chamber and within said screen on the other side of said barrier, and means for removing the condensate.

19. The apparatus of claim 18, wherein a vapor heating tube surrounds said screen.

20. The apparatus of claim 19, wherein said heating tube extends over substantially the full length of asid screen.

21. The apparatus of claim 19, wherein radiant heat baffle louvres surround said condenser inside of said screen.

22. The apparatus of claim 18, wherein said vapor barrier is formed for collecting the condensate.

23. The apparatus of claim 18, wherein means are provided for washing said condenser with a cold brine spray.

24. A freeze drying system comprising a sub-atmospheric pressure drying chamber, means in said chamber for supporting the frozen product, means for vaporizing a heat carrier liquid and passing the vapor through the product in said chamber, a refrigeration system having a refrigerant evaporator unit in said chamber for condensing both water vapor sublimed from the frozen product and heat carrier vapor, means for spraying brine over said refrigerant evaporator unit, means for removing the condensate-diluted brine and the carrier liquid from said chamber, means for separating said diluted brine from said carrier liquid, water evaporator means for removing the product condensate from a portion of said brine and conducting the re-concentrated brine to said brine spray means, and means for circulating the hot refrigerant of said refrigeration system in heat exchange relation with said separated carrier liquid before the liquid enters said vaporizing means.

25. The system of claim 24, wherein a heat exchanger is provided between the re-concentrated brine leaving said water evaporator means and the diluted brine entering said water evaporator means.

26. A freeze drying system comprising a sub-atmospheric drying chamber, means for supporting a layer of frozen product in said chamber, means for passing a readily condensable heat carrier vapor that is immiscible with water through the product, a vapor condenser, means for removing the condensed carrier liquid and the condensate-diluted brine from said chamber, means for separating the carrier liquid and the brine, means for vaporizing the carrier liquid and re-cycling it through said chamber, and means for recirculating the separated brine to said brine spraying means.

References Cited

UNITED STATES PATENTS

| 3,132,930 | 5/1964 | Abbott | 34—92 |
| 3,218,728 | 11/1965 | Barth | 34—5 |

WILLIAM J. WYE, *Primary Examiner.*

UNITED STATES PATENT OFFICE
CERTIFICATE OF CORRECTION

Patent No. 3,382,584                                             May 14, 1968

John H. Blake et al.

It is certified that error appears in the above identified patent and that said Letters Patent are hereby corrected as shown below:

Column 7, line 52, "552" should read -- 532 --. Column 8, line 49, "diverated" should read -- diverted --.

Signed and sealed this 17th day of March 1970.

(SEAL)
Attest:

Edward M. Fletcher, Jr.                          WILLIAM E. SCHUYLER, JR.
Attesting Officer                                         Commissioner of Patents